US009014871B2

(12) United States Patent
Luebke et al.

(10) Patent No.: US 9,014,871 B2
(45) Date of Patent: Apr. 21, 2015

(54) METHOD AND SYSTEM FOR ASSOCIATING A VEHICLE TRAILER TO A VEHICLE

(75) Inventors: Charles J. Luebke, Sussex, WI (US); Robert O. Anderson, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 1390 days.

(21) Appl. No.: 11/386,438

(22) Filed: Mar. 22, 2006

(65) Prior Publication Data

US 2007/0225872 A1 Sep. 27, 2007

(51) Int. Cl.

| | |
|---|---|
| ***G05D 1/00*** | (2006.01) |
| ***G05D 3/00*** | (2006.01) |
| ***G06F 7/00*** | (2006.01) |
| ***G06F 17/00*** | (2006.01) |
| ***G08B 21/00*** | (2006.01) |
| ***G08G 1/017*** | (2006.01) |

(52) U.S. Cl.
CPC .................................... *G08G 1/017* (2013.01)

(58) Field of Classification Search
USPC ............ 340/435, 436, 438, 431; 701/1, 9, 32, 701/34, 53
See application file for complete search history.

(56) References Cited

U.S. PATENT DOCUMENTS

| | | | | |
|---|---|---|---|---|
| 5,905,433 | A * | 5/1999 | Wortham | 340/431 |
| 2003/0025596 | A1* | 2/2003 | Lang et al. | 340/435 |
| 2005/0073433 | A1* | 4/2005 | Gunderson et al. | 340/903 |

* cited by examiner

*Primary Examiner* — Imran Mustafa
(74) *Attorney, Agent, or Firm* — Rader, Fishman & Grauer PLLC

(57) ABSTRACT

A system and method for associating a vehicle and vehicle trailer is described. The system comprises one or more sensors that transmit information wirelessly to a tractor display unit. The tractor display unit determines whether the sensor is associated with a trailer to which it is connected and filters out messages from sensors that are not associated with its trailer. To determine which sensors are associated with its trailer, a processor in the tractor display unit synchronizes the reception of sensor messages with the reception of a synchronizing signal, such as a signal generated by operating an auxiliary power system, turn signal, or brake.

25 Claims, 10 Drawing Sheets

METHOD AND SYSTEM FOR ASSOCIATING A VEHICLE TRAILER TO A VEHICLE

BACKGROUND

In certain types of multi-component vehicle systems, a powered vehicle, such as a cab or tractor, is selectively attached to and pulls a trailer. Typically, electrical components in the trailer such as turn signals, reverse lights, and obstacle sensors receive power from and/or transmit information to the powered vehicle via hardwired electrical connections. One typical hardwired arrangement uses a seven-way plug to connect the powered vehicle to a variety of trailer components.

As the number of trailer components increases, so does the need for additional hardwired connections. For example, trailers frequently employ a number of sensors to indicate the condition of the trailer to an operator such as the driver in the powered vehicle. Side obstacle sensors are used to indicate if an obstacle is located proximate the side of the trailer, which could result in an accident in the event of a sudden lane change or turn. Also, back up sensors are frequently used to indicate the presence of an obstacle proximate the rear of the trailer to prevent collisions when the vehicle is in reverse gear. Each sensor requires its own hardwired connection to a display unit or alarm panel in the tractor cabin to inform the driver whether an obstacle is present. If multiple trailers are attached to a single powered vehicle and/or of multiple sensors are used on each trailer, the number of hardwired connections can be substantial. It can be costly and cumbersome to retrofit existing tractors to accommodate additional sensor signals.

Given the limitations of hardwired connections, it is desirable to transmit sensor signals wirelessly from the trailer to the powered vehicle. However, the use of wireless communications poses certain problems. The operator of a particular powered vehicle will only want to receive sensor indications for the specific trailer to which it is attached. However, if nearby trailers are also transmitting wireless sensor signals, the operator may receive signals from them. As a result, the operator may receive nuisance alarms or could be falsely led to believe that obstacles are present (or are not present) near his trailer. Accordingly, a need has arisen for a method and system that addresses the foregoing issues.

SUMMARY OF THE EMBODIMENTS

A method for determining whether a vehicle trailer sensor is associated with a vehicle comprises synchronizing a reception of a trailer sensor message with a reception of a synchronizing signal. In certain illustrative embodiments, the synchronizing signal is generated by operating a vehicle control.

A method of communicating vehicle trailer sensor information to a vehicle operator comprises synchronizing a reception of a trailer sensor message with a reception of a synchronizing signal. It further comprises identifying sensors associated with the vehicle based on the synchronizing a reception of a trailer sensor message with a reception of a synchronizing signal, and communicating sensor messages for sensors associated with the vehicle to the vehicle operator. In certain exemplary embodiments, the synchronizing signal is generated by operating a vehicle control.

A method for displaying vehicle trailer sensor data to a vehicle operator comprises determining whether a synchronizing signal has been received. It further comprises receiving a first set of trailer sensor data, the first set of trailer sensor data comprising trailer sensor identification information, wherein the first set of data is received within a predetermined period of time after the synchronizing signal is received. The method also comprises receiving a second set of trailer sensor data, the second set of trailer sensor data comprising sensed information and trailer identification information. The sensed information is communicated to the vehicle operator if the trailer identification information in the second set of trailer sensor data set corresponds to the trailer identification information in the first set of trailer sensor data.

A system for associating a vehicle trailer with a vehicle comprises a measurement device and a processor. The measurement device comprises a trailer sensor and a wireless communication device. The processor is programmed to synchronize a reception of a trailer sensor message with a reception of a synchronizing signal. In certain illustrative embodiments, the system further comprises a vehicle control, and when the vehicle control is operated, the measurement device transmits trailer sensor messages. In certain other illustrative embodiments, when the vehicle control is operated, power is supplied to the measurement device. In additional exemplary embodiments, the vehicle control is one selected from a turn signal control, a brake, and an ignition.

DETAILED DESCRIPTION

Figure 1:
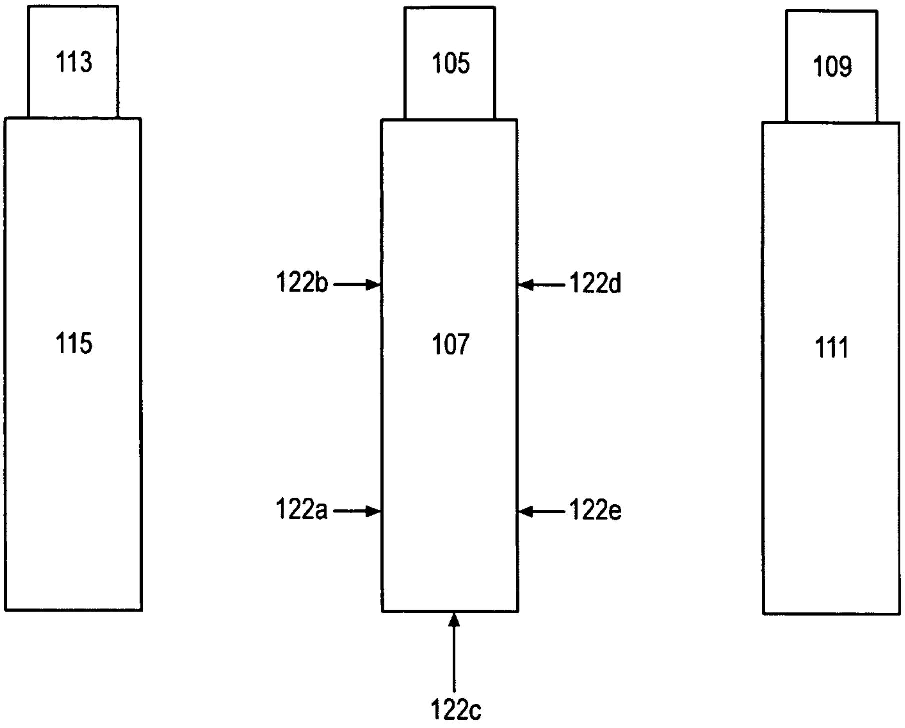
FIG. 1 depicts an exemplary arrangement of vehicles used to illustrate a method of associating a vehicle and vehicle trailer, as seen from a top plan view.

FIG. 1 provides an exemplary arrangement of vehicles used to illustrate a method of associating a vehicle and vehicle trailer. In the figure, tractor 105 is attached to and pulls trailer 107. Trailer 107 contains a plurality of sensors 122*a*-122*e*, which are used to provide information about the condition of the trailer. For example, sensors 122*a* and 122*b* may comprise side obstacle sensors used to indicate the presence of an object proximate a first side of trailer 107. Sensor 122*c* may comprise a backup sensor used to indicate the presence of an object proximate the rear of trailer 107. Sensors 122*d* and 122*e* may comprise side obstacle sensors used to indicate the presence of an object proximate a second side of trailer 107. In addition, one or more of the sensors may comprise other types of sensors such as trailer refrigerator temperature sensor. Also, tractor 105 may have a plurality of trailers, each of which has its own set of sensors.

Sensors 122*a*-122*e* are preferably configured to transmit wireless signals to a tractor display unit in the cabin of tractor 105. However, other tractor trailer combinations such as tractor 113/trailer 115 and tractor 109/trailer 111 may be located proximate tractor 105/trailer 107. The depicted vehicle arrangement may occur, for example, if the three vehicles are driving near one another on a multi-lane road or if they are located in a truck yard. If the adjacent vehicles include trailer sensors that also transmit wireless signals, they may provide a false indication to the driver of tractor 105 that an obstacle is present. Thus, tractor 105 preferably includes a system which associates only sensors located on trailer 107 (i.e., sensors 122*a*-122*e*) with it. The system preferably disregards wireless transmissions from trailers 111 and 115 so that they are not displayed to the driver of tractor 105.

Figure 1A:
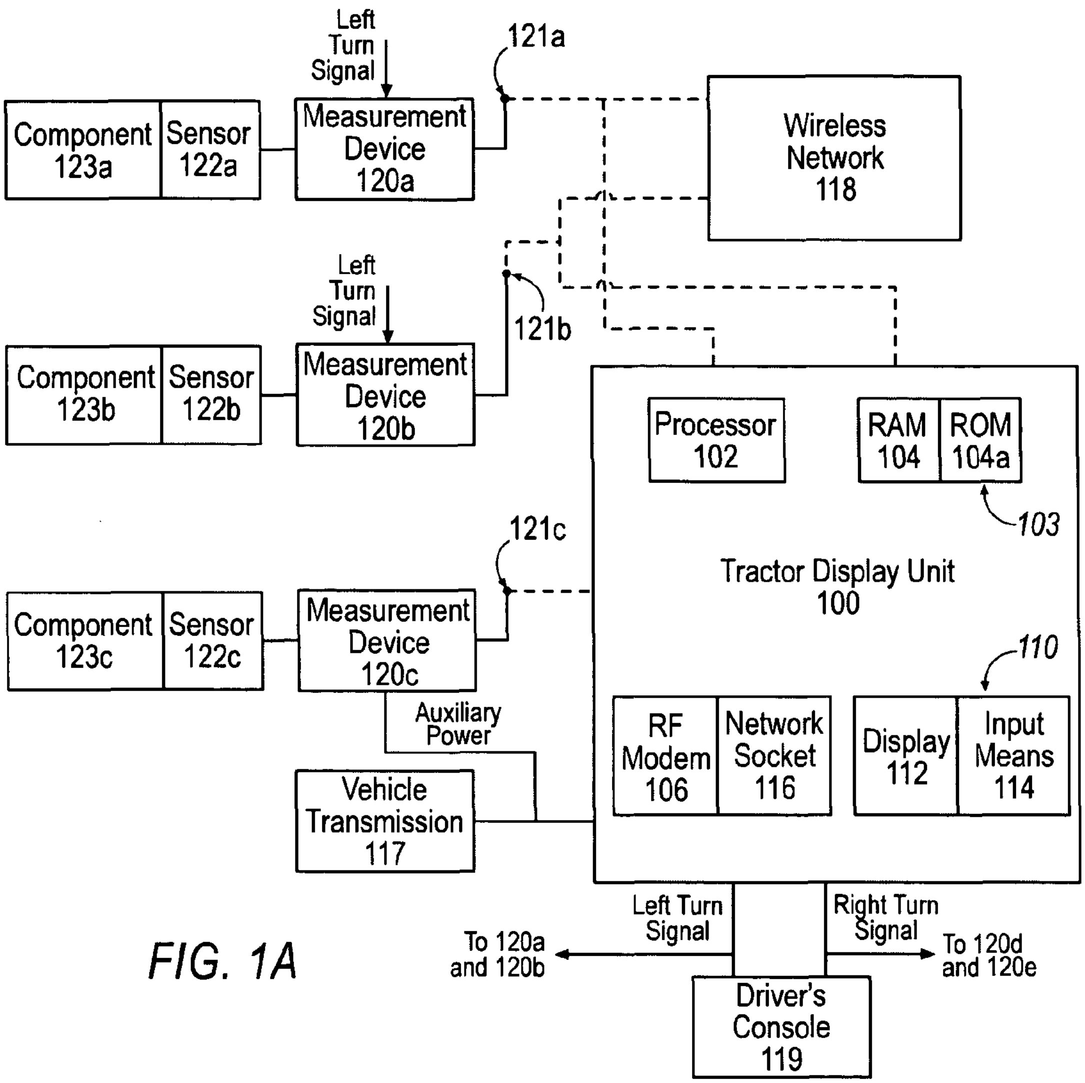
FIG. 1*a* depicts a system for associating a vehicle and vehicle trailer sensors.

FIG. 1*a* depicts an embodiment of a system for associating sensors on trailer 107 with tractor 105. Tractor display unit 100 is preferably located in the cabin of tractor 105. Tractor display unit 100 displays various types of information to the driver about the state of the vehicle 105 and its trailer 107.

Tractor display unit 100 generally comprises a processor 102, a memory 103 comprising RAM (random access memory) 104 and ROM (read-only memory) 104*a*, as well as an RF (radio frequency) modem 106. In most embodiments tractor display unit 100 also comprises a user interface 110, which in turn comprises a display 112 and input means 114. Tractor display unit 100 further comprises a network socket 116, through which network communications, including wireless communications, may occur. In some embodiments tractor display unit 100 may be a personal laptop or desktop computer, a handheld computer such as a personal digital assistant or a Java™-enabled device, a cellular telephone, or some other computing device such as is known to those skilled in the art. Various displays and input means used with such devices are well known in the art, and may be used in the present invention.

RF modem 106 is used by tractor display unit 100 to receive and/or send wireless communications, sometimes through a wireless network 118, using any one of a number of standards and technologies that are known to those skilled in the art, including but by no means limited to Bluetooth®, IEEE 802.11, cellular networks, or any other form of wireless transmission known to those skilled in the art.

Software instructions loaded into RAM 104 from ROM 104*a* or some external medium are executable by processor 102 for configuring, retrieving, and processing data from at least one of measurement devices 120*a*, 120*b*, 120*c* attached to sensors 122*a*, 122*b*, and 122*c*, respectively. Tractor display unit 100 communicates either directly or through wireless network 118 with measurement devices 120*a*, 120*b*, 120*c*.

Examples of sensor 122 include optical or infrared photo sensors, ultrasonic sensors, radar sensors or laser based sensors. Measurement device 120 and/or sensor 122 are preferably powered by an attached vehicle, such as tractor or cab. In the embodiment of FIGS. 1 and 1*a*, sensors 122*a* and 122*b* comprise left side trailer side obstacle sensors which are powered by a left turn signal light conductor when a turn signal is activated. Thus, in FIG. 1*a*, they are each connected to the left turn signals of vehicle 105, which are in turn connected to driver console 119. Right side sensors such as sensors 122*d* and 122*e* (not shown in FIG. 1A) are preferably powered by a right turn signal conductor when the right turn signal is activated. Instead of using the turn signals to provide power, other systems such as the auxiliary power system can also be used. Measurement devices 120*a* and 120*b* also include antennas 121*a* and 121*b*, respectively, to facilitate wireless communications to and from RF modem 106.

In the embodiment of FIGS. 1 and 1*a*, sensor 122*c* is a backup sensor. As shown in the figure, measurement device 120*c* is preferably powered by the tractor's auxiliary power system when vehicle 105 is started. However, it may also be powered by other systems that typically remain energized when the vehicle is put in reverse. For example, trailer running/marker light signals, tail light signals or license plate lamp signals could be used. However, they would preferably be configured to remain energized during both daytime and nighttime operation. Measurement device 120*c* also includes antenna 121*c* to facilitate wireless communications to and from RF modem 106.

Figure 1B:
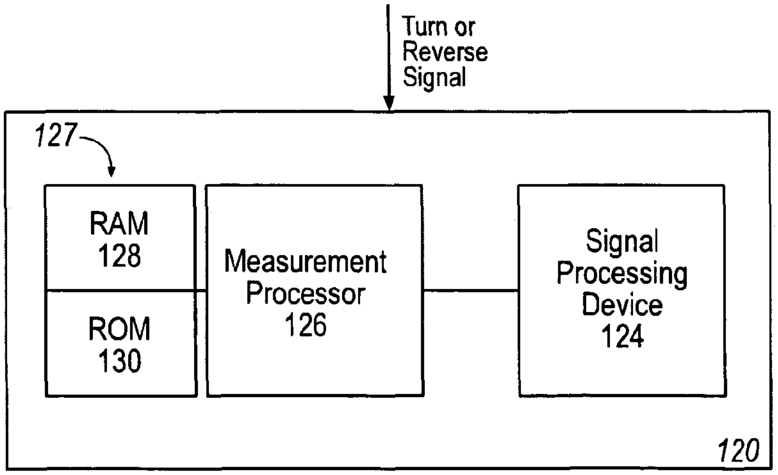
FIG. 1*b* provides a detailed view of a measurement device attached to a sensor.

Measurement device 120 is shown in more detail in FIG. 1*b*. Measurement signal processing device 124 preferably enables measurement device 120 to communicate with RF modem 106 via a direct wireless connection or via wireless network 118. In FIG. 1*a*, the wireless connection between measurement device 120*c* and wireless network 118 has been omitted for simplicity. However, like measurement devices 120*a* and 120*b*, measurement device 120*c* may communicate with RF modem 106 via direct wireless connection or via wireless network 118.

In one preferred embodiment, measurement signal processing device 124 comprises a two-way radio. The two way radio is preferably a digital spread spectrum radio with good noise immunity. In an especially preferred embodiment, measurement signal processing device comprises a ZIGBEE™ Transceiver.

In some embodiments measurement signal processing device 124 is detachable from and interchangeable with each of measurement devices 120*a*, 120*b*, and 120*c*. whereas in other embodiments measurement signal processing device 124 is a permanent portion of measurement device 120. Measurement signal processing device 124 further comprises a measurement processor 126 and a memory 127 comprising a RAM 128 and a ROM 130. Software instructions loaded into RAM 128 from ROM 130 are executable by the processor for recording, configuring, and sending information to tractor display unit 100.

The system of FIG. 1*a* also preferably comprises one or more vehicle controls used to perform certain functions in tractor 105. As will be explained below, to identify the sensors associated with vehicle (tractor) 105, processor 102 is preferably programmed to synchronize the reception of trailer sensor messages with the reception of a synchronizing signal. The synchronizing signal is preferably generated by operating a vehicle control. For example, a turn signal control lever is typically actuated to operate a turn signal. Thus, in the embodiment of FIG. 1*a*, two connections are provided between driver's console 119 and tractor display unit 100 to provide an indication that either the left or right turn signal has been operated. In addition, the ignition is used to power up tractor 105 and activate its auxiliary power system. Thus, in the embodiment of FIG. 1*a*, a connection is provided between ignition 117 and display unit 100 to indicate the activation of auxiliary power. The turn signal and auxiliary power wires are also used to provide an indication to display unit 100 as to when the turn signal is operated or the auxiliary power is activated. The signal wires are at 0V when the signal is off and 12V when the signal is on.

While the synchronizing signal is preferably generated by operating a vehicle control, it need not be. For example, in one embodiment, power supplied to measurement devices 120*a*-120*c* could be interrupted for a brief period time (e.g., 10 milliseconds) to indicate the occurrence of a synchronization event. Also, a power line carrier signal could be injected in the signal wires such that measurement devices 120*a*-120*c* would detect it, preferably without interruption to the turn signal light or other components that are on a common power supply with the relevant measurement device and sensor.

In addition to turn signals and auxiliary power, display unit 100 and one or more of measurement devices 120*a*-120*c* may be connected to other systems or components to provide synchronization, for example, the activation of the brakes (which activate stop lamps), trailer marker/running lights, tail lights, license plate lamps, hazard lamps, antilock brake system (ABS), and clearance and ID lamps of vehicle 105 can be used to provide synchronization.

Figure 2:
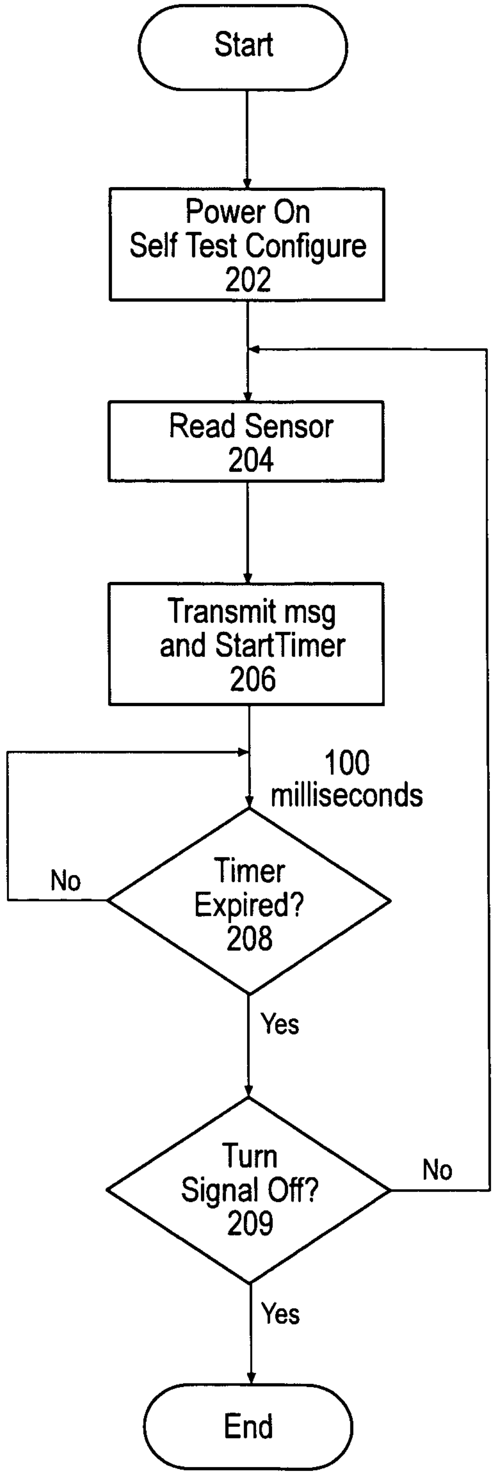
FIG. 2 is a flow chart that illustrates a method of wirelessly transmitting sensor information from a trailer sensor to a tractor display unit.

FIG. 2 describes the function of a measurement device 120 used with a sensor 122 such as a trailer side obstacle sensor or back up sensor. In step 202, measurement device 120 is powered on. Measurement device 120 is preferably powered up in response to the operation of a vehicle control, the activation of trailer marker/running lights, or the activation of auxiliary power in tractor 105. For example, in one embodiment, a trailer side sensor is powered up when the turn signal for the side of the trailer to which the sensor is connected is activated and the corresponding turn signal light is illuminated. In another embodiment, sensor 122 is a backup sensor, and step 202 is initiated when the ignition is operated to activate auxiliary power.

As mentioned above, in one exemplary embodiment, measurement devices 120*a* and 120*b* for side obstacle sensors 122*a* and 122*b* and/or measurement device 120*c* for backup sensor 122*c* are connected to the auxiliary power system of tractor 105 such that the initiation of auxiliary power initiates step 202 and the remaining sequence of steps in FIG. 2. However, in another exemplary embodiment, the activation of auxiliary power causes step 202 to be executed, but step 204 is not executed until a vehicle control signal is received. This embodiment improves synchronization with the activation of a vehicle control by eliminating the Power On Self Test (POST) time when the control is activated, thereby allowing a smaller response time and improved discrimination of sensors associated with vehicle 105 from those are not associated with it. This same technique can be used if other systems, such as the trailer marker/running lights, tail lights, license plate lamps, and clearance and ID lamps, are used to supply power to the sensors. However, the power source preferably supplies power to the sensor during vehicle operations for which the sensor's information is relevant (e.g., during reverse movement for a back up sensor and during turns for a side obstacle sensor). In one exemplary embodiment, a trailer side obstacle sensor is powered up in step 202 by the activation of auxiliary power, and step 204 is executed when a turn signal is activated. In another exemplary embodiment, a back up sensor is powered up in step 202 by the activation of auxiliary power, and step 204 is executed when the brake is activated.

In step 202, measurement device 120 is also initialized. As part of the initialization, measurement signal processing device 124 is initialized to enable communication with RF modem 106. This comprises measurement device 120 loading configuration information into RAM 128 by loading information stored in memory 127 of measurement device 120. Configuration information for measurement device 120 comprises the type of measurement for which it is to be configured (e.g., side obstacle or rear obstacle, etc.). Configuration information also generally includes an identification of the type of signal that measurement device 120 will be receiving from sensor 122 (e.g., type of digital or analog signal).

Returning to FIG. 2, next, in step 204, sensor 122 provides input or inputs to measurement device 120. These inputs may be in any of a number of formats known to those skilled in the art, such as known analog or digital signals. In embodiments in which sensor 122 is a gauge or transducer in a vehicle, sensor 122 typically provides analog signals in a range of between zero to approximately twelve (12) volts or a digital signal of zero or one.

Next, in step 206, measurement device 120, transmits a message to RF modem 106 in tractor display unit 100. Messages are preferably transmitted at pre-determined intervals, $t_1$. In one exemplary embodiment, $t_1$ is not greater than about 100 milliseconds. To facilitate timed transmissions, a program is provided in memory 127 that monitors the elapsed time since the initiation of step 206. In step 208, the program determines whether $t_1$ has yet elapsed. If it has not, step 208 is re-executed. Once $t_1$ has elapsed, the program checks to see if the turn signal is off in step 209. If it is not, control is returned to step 204 where sensor data is again read and transmitted to RF modem 106 in step 206. If the turn signal has been turned off (step 209), the measurement device is powered off until the turn signal is again activated.

Figure 3:
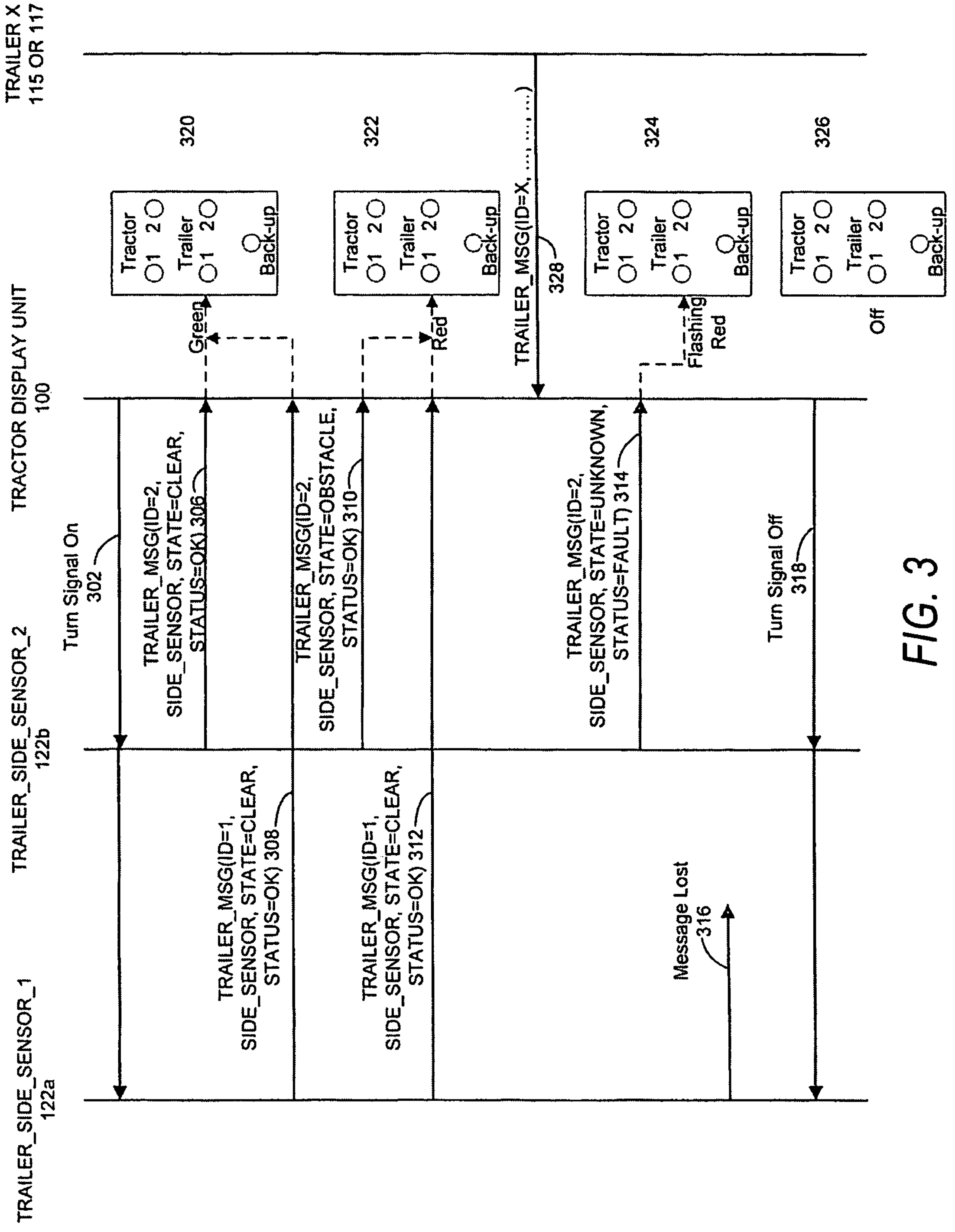
FIG. 3 is a message flow diagram which illustrates a method of transmitting wireless messages from trailer obstacle sensors and displaying the messages in a tractor display unit.

Tractor display unit 100 is preferably configured to display sensor information that is wirelessly transmitted by measurement devices 120 to RF modem 106 about the condition of tractor 105 and/or trailer 107. A program, which determines the nature and content of the displayed sensor information, is preferably stored in memory 103 and executed by processor 102. A variety of types of sensor information and displays may be used. Referring to FIG. 3, an embodiment of a method of transmitting wireless messages from trailer sensors 122 to tractor display unit 100 is described. In the embodiment of FIG. 3, trailer sensors 122 are trailer side obstacle sensors 122*a* and 122*b* (TRAILER_SIDE_SENSOR_1 and TRAILER_SIDE_SENSOR_2), each of which is positioned at a different location on the same side of trailer 107 (see FIG. 1). Another trailer sensor connected to a trailer (TRAILER X) such as trailer 111 or trailer 115 (FIG. 1) is not connected to tractor 105. Nevertheless, trailer x also sends wireless messages which are received by RF modem 106 in tractor display unit 100. Although not separately depicted, one or more trailer back up sensors (such as backup sensor 122*c* in FIG. 1) may also be configured to transmit messages to tractor display unit 100.

In step 302, measurement devices 120*a* and 120*b* and/or their associated sensors 122*a* and 122*b* are powered up in response to the activation of a turn signal. Power is preferably supplied due the activation of a vehicle control in tractor 105. In the embodiment of FIG. 3, sensors 122*a* and 122*b* are connected to the turn signal light conductor and are powered up by the activation of the turn signal on driver console 119 (see FIG. 1*a*). However, sensors 122*a* and 122*b* may also be powered up by other circuits such as the auxiliary power circuit of tractor 105.

As explained above with respect to FIG. 2, at predetermined intervals "$t_1$," measurement devices 120*a* and 120*b* transmit data from sensors 122*a* and 122*b*, respectively, to RF modem 106 in tractor display unit 100. The sensor data may have a variety of formats and information. In an exemplary embodiment, each set of sensor data includes four pieces of information or data fields: 1) a sensor identification number, 2) a sensor descriptor, 3) a sensor state, and 4) a sensor status.

For example, measurement device 120*b* transmits message 306 to RF modem 106 based on information provided by sensor 122*b*. In an exemplary format, the message is TRAILER_MSG (ID=2, SIDE_SENSOR, STATE=CLEAR, STATUS=OK). The first field represents a sensor identification number, and has a value of "2," which uniquely identifies sensor 122*b*. The second field represents a sensor descriptor and has a value of "SIDE_SENSOR", which indicates that sensor 122*b* is a side obstacle sensor. In the case of a backup sensor, the second field would have a value of "BACK-UP_SENSOR," or something similar. The third field describes the state of the sensor and has a value of "OBSTACLE," indicating that an obstacle is present near sensor 122*b*. The fourth field represents the sensor status and has a value of "OK," indicating that the sensor is operating and transmitting normally.

Similarly, message 308 is transmitted from measurement device 120*a* based on information from sensor 122*a*. Message 308 is TRAILER_MSG (ID=1, SIDE_SENSOR, STATE=CLEAR, STATUS=OK). The message indicates that the sensor identification number is "1," and that the sensor is a side obstacle sensor. Because sensor 122*a* did not detect an obstacle, the value of the sensor state is "CLEAR." In addition, the status of the sensor is "OK," indicating that it is operating and transmitting normally.

As will be explained below, tractor display unit 100 is preferably configured to identify those sensors that are attached to trailer 107 and to display only messages originating from the identified sensors, while disregarding messages received from other sensors. Because sensors 122*a* and 122*b* are attached to trailer 107, tractor display unit 100 will preferably display the sensor states for sensors 122*a* and 122*b* on display 112. It may also display other types of sensor information such as sensor identification numbers, sensor type and/or sensor status.

Display 112 can be configured to present sensor state information in a variety of ways. In one exemplary embodiment, depicted as display panel 320 in FIG. 3, a panel of lights is provided. In accordance with the embodiment, the first row of indicator lights is for the left and right tractor side obstacle sensors. The number 1 refers to the left side of the tractor, and the number 2 refers to the right side of the tractor. The second row of indicator lights is for the trailer side obstacle sensors. The number 1 refers to sensors 122*a* and 122*b*, which are on the left side of the trailer. The number 2 refers to sensors 122*d* and 122*e* (whose messages are not illustrated in FIG. 3), which are on the right side of the trailer. In this embodiment, all received sensor message states on one side of the trailer must be CLEAR in order for that side's light on display 320 to appear green. If any sensor on one side of the trailer has a sensor message state of OBSTACLE, the light for that side of the vehicle will be red. If a signal is not received from a sensor that is associated with the vehicle's trailer, the light for the side of the vehicle on which the sensor is located will flash red. As shown in display panel 320, if a back up sensor is used, it may also have a display light.

The lights in display 112 may be physical lights or they may be graphical depictions of lights on a computer display. Alternatively, display 112 may provide text messages, or an audible alarm may be generated by tractor display unit 100 to provide sensor state information to the driver. Because both message 306 and 308 have states of CLEAR, the light for side 1 will be lit in a steady green pattern on display 320.

After a predetermined interval $t_1$ has again elapsed, measurement device 120*b* will transmit message 310 to RF modem 106, and measurement device 120*a* will transmit message 312 to RF modem 106. Message 310 is TRAILER_MSG (ID=2, SIDE_SENSOR, STATE=OBSTACLE, STATUS=OK), and message 312 is TRAILER_MSG (ID=1, SIDE_SENSOR, STATE=CLEAR, STATUS=OK). Message 310 indicates that sensor 122*b* has the identifier 2, that it is a side obstacle sensor, that there is an obstacle present, and that the sensor is functioning normally. Message 312 indicates that sensor 122*a* has the identifier 1, that it is a side obstacle sensor, that there is no obstacle present, and that the sensor is functioning normally. Sensors 122*a* and 122*b* are on the same side of trailer 107. As a result, because sensor 122*b* indicates the presence of an object near the left side of trailer 107, light 1 will be lit in a steady red pattern even though sensor 122*a* indicates that no object is present.

Tractor display unit 120 is also preferably programmed to inform the driver when a sensor has failed or when it has failed to communicate with RF modem 106 within a predetermined period of time. For example, message 314 is TRAILER_MSG (ID=2, SIDE_SENSOR, STATE=CLEAR, STATUS=FAULT). The message contains FAULT in its sensor status field, indicating that sensor 122*b* is not operating normally. Display 112 is preferably configured to distinguish a fault condition from one in which an obstacle is present. In one exemplary embodiment, depicted in display panel 324, a flashing red light is used to indicate whether sensor 122*a* or sensor 122*b* is in a fault condition. However, as with sensor state information, sensor status information can be displayed in a variety of ways, including as a text message or an audible alarm.

In some instances, exemplified by message 316, sensors 122*a* and 122*b* may be working properly, but no message is received by RF modem 106. In that case, a flashing red light is also used to indicate that the message from sensor 122*a* was not received. However, text messages and audible alarms may also be used to indicate the non-receipt of sensor data.

As discussed previously, one or more tractor-trailers such as tractor 109/trailer 111 and tractor 113/trailer 115 shown in FIG. 1 may be located proximate tractor 105/trailer 107. These other trailers may also have sensors that are wirelessly transmitting signals intended for a modem other than RF modem 106. Message 328 is an exemplary embodiment of a message provided by such a sensor, which has the identifier "X." Because "X" is not recognized as a valid sensor identifier by tractor display unit 100, message 328 is disregarded and is not displayed to the driver. However, the identifier X may be added to a list of sensors stored in memory 103 which are to be ignored for future reference in processing received sensor signals (the "ignore list").

Figure 3A:
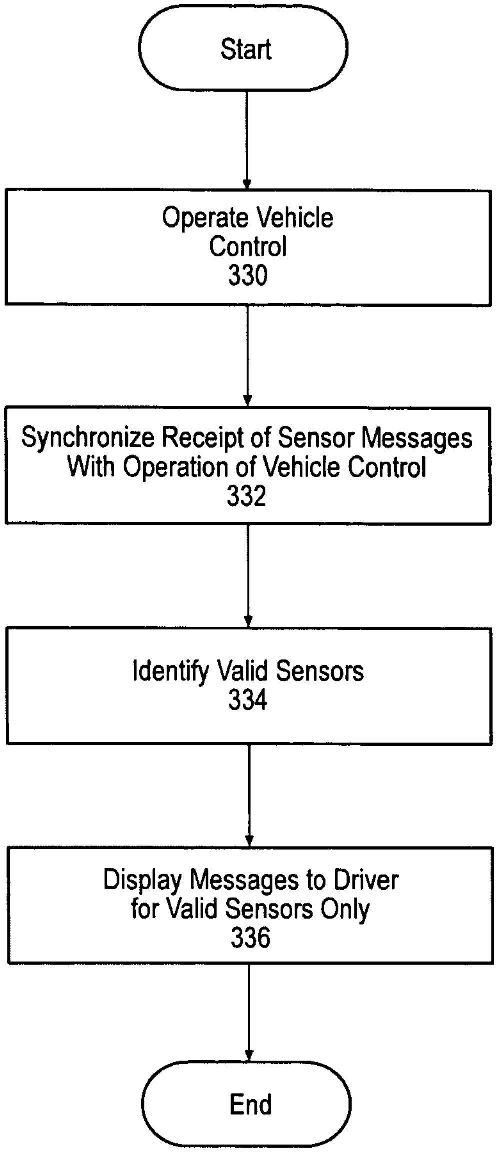
FIG. 3*a* describes a first embodiment of a method for associating a vehicle trailer and a vehicle.

As mentioned above, tractor display unit 100 is preferably configured to identify those sensors that are attached to trailer 107, and therefore, which are associated with tractor 105. In FIG. 3*a*, a first embodiment of a method for making this association is depicted. The method is preferably implemented via a program that is stored in memory 103 and executed by processor 102 of tractor display unit 100. Because the turn signal can be used to supply power to measurement devices 120*a* and 120*b* and/or sensors 122*a* and 122*b*, tractor display unit 100 can synchronize the reception of messages from trailer sensors 122*a* and 122*b* with the operation of the turn signal to determine which sensors are associated with trailer 107.

Referring to FIG. 3*a*, in step 330 a vehicle control is operated. The operation of the vehicle control preferably causes power to be supplied to measurement device 120 and/or sensor 122 via one of the turn signals of vehicle 105. In the case of side obstacle sensors such as sensors 122*a* and 122*b* in FIG. 1, measurement devices 120*a* and 120*b* are preferably connected to the left turn signal light conductor and are powered up in response to the operation of the left turn signal. Although side obstacle sensors and back up sensors are used to illustrate the method, it should be understood that any trailer sensor can be associated with a vehicle using the method by synchronizing its transmission of sensor messages with the operation of a vehicle control, if the operation of the vehicle control causes power to be supplied to the sensor (or its measurement device) or causes it to transmit a synchronization message, as described below.

In step 332, the program synchronizes the reception of sensor messages with the operation of the turn signal. The program preferably receives a turn signal input from driver's console 119 (FIG. 1*a*), which enables it to perform the synchronization. As discussed with respect to FIG. 2, the operation of the turn signal causes the transmission of wireless messages from sensors 122*a* and 122*b* to RF modem 106. Thus, the reception of sensor messages or data, concurrently with or very shortly after the operation of the turn signal, can be used to indicate which sensors are located on trailer 107. Accordingly, in step 334 the program uses this synchronization principle to identify a list of valid sensors, i.e. sensors attached to trailer 107. Based on the list of valid sensors, the program then filters received sensor messages, displaying only those that originated from valid sensors in step 336.

In the embodiment of FIG. 3*a*, the powering up of measurement devices 120*a* and 120*b* and/or sensors 122*a* and 122*b* indicates the occurrence of a synchronization event. In other words, measurement devices 120*a* and 120*b* will not transmit messages to display unit 100 until the synchronization event occurs and power is supplied to them. Thus, the transmission of sensor messages itself indicates that measurement devices 120*a* and 120*b* recognized the occurrence of a synchronization event (i.e., turn signal activation). However, in another embodiment, measurement devices 120*a* and 120*b* may be configured to transmit a unique sensor message when synchronization occurs. In this embodiment, the TRAILER_MSG format shown in FIG. 3 would preferably be altered to include data that indicates the occurrence of a synchronization event, for example, by adding an additional data field or modifying an existing data field. Further, a program resident in memory 127 of the respective memory device 120 would preferably detect the occurrence of a synchronization event and send an appropriate TRAILER_MSG to RF Modem 106 to indicate that synchronization has occurred.

Figure 4:
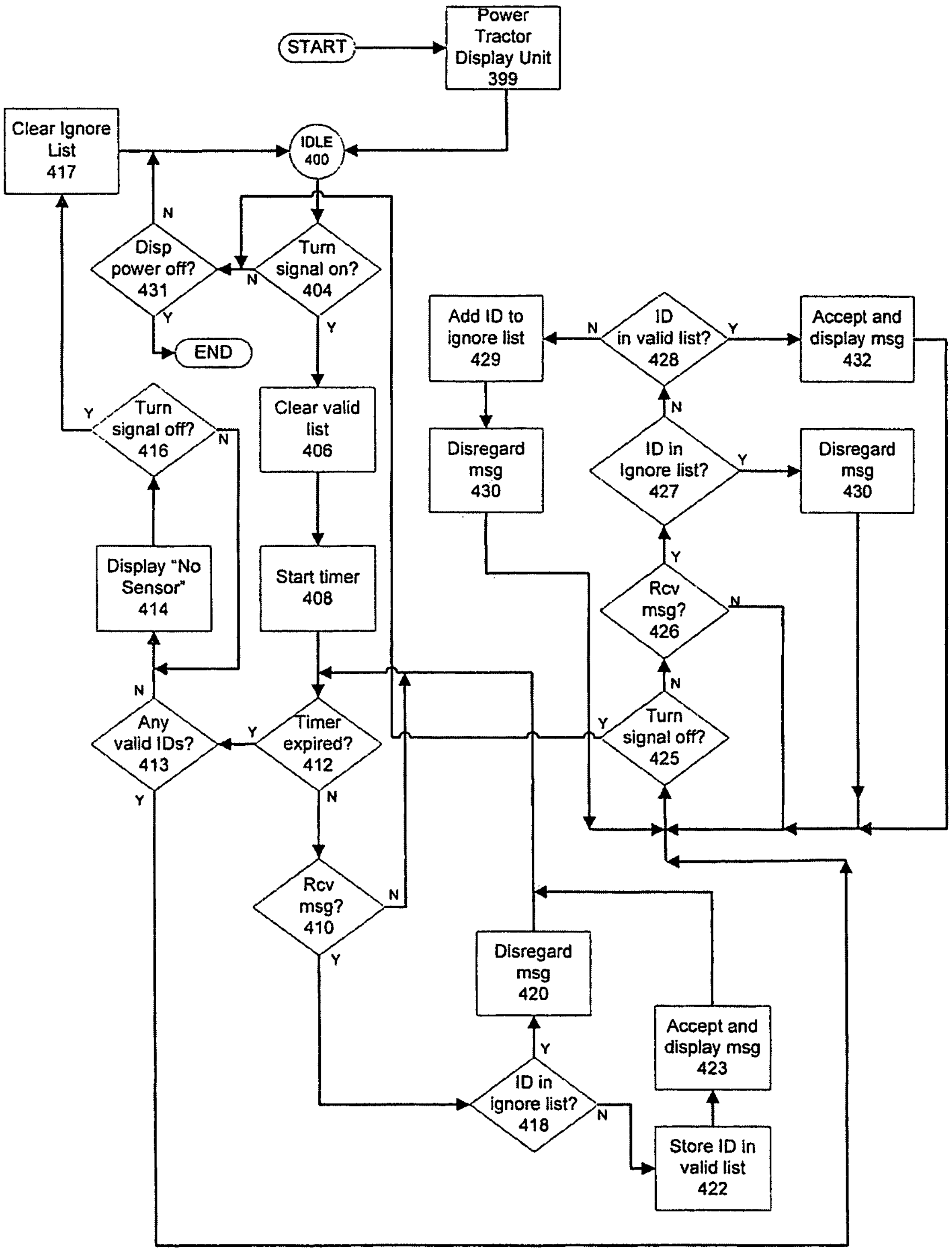
FIG. 4 describes a second embodiment of a method for associating a vehicle trailer and a vehicle.

A second embodiment of a method for associating a vehicle and vehicle trailer is depicted in FIG. 4. As with the previous method, the method of FIG. 4 is preferably implemented by a program stored in memory 103 of tractor display unit 100.

Referring to FIG. 4, in step 399 the tractor display unit is powered on. In step 400, display unit 100 is in an idle mode. In this mode, display unit 100 may receive sensor messages even though no vehicle control has yet been activated. Because the vehicle control has not been activated, display unit 100 recognizes any messages that are received as invalid (i.e., as not pertaining to sensors associated with trailer 107) and adds their identifiers to an ignore list register in step 403 (not shown). In step 402 (not shown), display 112 is preferably cleared within a predetermined time after returning to the idle state. In an exemplary embodiment, the predetermined time is about one (1) second.

In accordance with the embodiment, the program determines whether a particular vehicle control has been operated. The operation of the vehicle control is used to synchronize the reception of sensor messages and develop a list of valid sensors that are associated with trailer 107. In the embodiment of FIG. 4, the method is illustrated with side obstacle sensors. However, it can also be used with other sensors, including but not limited to backup sensors and trailer refrigerator temperature sensors.

In step 404, the program determines whether the turn signal has been activated. As indicated in FIG. 1*a*, tractor display unit 100 detects the operation of the turn signal via a connection from driver's console 119. If a back up sensor is used, tractor display unit 100 detects the activation of auxiliary power, which is initiated via ignition 117. The program stored in memory 103 is therefore able to determine when the turn signal was first activated (or auxiliary power was first activated) and generate a timer sequence, as discussed below.

If the turn signal (or auxiliary power in the case of a back up sensor) has not been activated, in step 431 the program determines if display unit 100 has been powered off. If it has not, control returns to idle state 400. If the turn signal has been activated, however, in step 406 the program clears a previously stored list of valid sensor identifiers from memory 103. The valid sensor identifiers are the identifiers for those sensors that were previously determined to have been attached to trailer 107, and therefore, associated with tractor 105.

In step 408, the program initiates a timer sequence. The timer sequence is used to identify the sensors that are associated with trailer 107 (or whether no sensor is associated with the trailer). The timer sequence preferably determines whether any sensor signals have been received within a predetermined time interval $t_2$, as described above. The interval is preferably selected to be greater than the time required for a trailer sensor to power on and self test, read, and transmit a message. It is also preferably less than the typical period of activation of a turn signal, which is about 0.5 seconds. In an especially preferred embodiment $t_2$ is not greater than about 200 milliseconds.

In step 412, the program determines whether the timer has expired (i.e., whether the interval $t_2$ has elapsed). If the timer expires prior to the receipt of any sensor messages, the program determines if any valid sensor messages have been received prior to the expiration of the timer (step 413). If no valid identifiers were received, then in step 414 display 112 provides an indication to the driver that no sensor is associated with tractor 105. The indication may be provided in a number of ways, such as the display panels 320-326 described previously, text messages, an audible alarm, or via a computer graphical user interface on display 112 in tractor display unit 100. If no sensor is associated with tractor 105, in step 416 the program determines whether the turn signal has been turned off. If it has not, display 112 continues to indicate that no sensor is associated with tractor 105. If the turn signal has been turned off, the ignore list register is cleared (step 417) and control is returned to the idle state 400. As explained below, the ignore list register contains the identifiers of invalid sensors that are known not to be associated with trailer 107. Display 112 (or panel lights, etc.) is then cleared (step 402, not shown).

Steps 410, 412, 418, 420, 422, and 423 comprise an embodiment of a method for synchronizing the reception of sensor messages with the reception of synchronizing signal generated by operating a turn signal. In accordance with the method, the program identifies sensor messages that are received within a predetermined time period after the operation of the turn signal. Accordingly, in step 410, the program determines if a sensor message has been received. Initially, if no message is received, control returns to step 412. Once a message is received, however, the program determines if the sensor from which it originated is stored in the ignore list register (step 418). For example, using the message format of FIG. 3, the program can compare the sensor identification number for the originating sensor with the sensor identification numbers stored in the ignore list register. The ignore list register is preferably generated based on messages that were previously received from sensors determined not to be associated with trailer 107, as explained below.

If the message originated from a sensor in the ignore list register, the message is disregarded in step 420. Control is then returned to step 412 where the program determines if the timer has expired. If the timer has not yet expired, the program again determines whether a sensor message has been received in step 410.

If a message received in step 410 did not originate from a sensor in the ignore list register, in step 422 the sensor identifier is stored in a list of valid sensors in memory 103. In step 423, the message is then accepted and displayed (e.g., as shown in display panel 320 in FIG. 3). Control is then returned to step 412 to determine whether the timer has expired. Once the timer expires, the identification process is complete and the list of valid sensors is fixed (until the turn signal is turned off).

In step 413, if at least one valid message has been received, control proceeds to step 425. In step 425, the program determines whether the turn signal has been turned off. If it has, control is returned to step 431. If the turn signal has not been turned off, the program now begins to filter messages based on the list of valid sensors identified previously. Thus, in step 426, the program determines whether another sensor message has been received. If no message is received, control returns to step 425. If a message is received, the program determines if the message originated from a sensor in the ignore list (step 427). If it did, the message is disregarded in step 430 and control is returned to step 425. If the program determines that the message did not originate from a sensor in the ignore list, in step 428 the program determines whether the sensor is in the list of valid sensors. If it is not, the message is disregarded (step 430) and the sensor identification number is added to the ignore list register (step 429). Control is then returned to step 425. If the sensor is in the list of valid sensors, in step 432 the message is accepted and displayed. Control is then returned to step 425 to determine whether the turn signal has been turned off.

As indicated above, the ignore list register is used to filter out messages that are not valid. However, if a vehicle's trailer is switched, a previously ignored sensor from a neighboring trailer may now become physically associated with the vehicle (tractor). Thus, tractor display unit 100 is preferably configured to allow the ignore list to be cleared out by activating the turn signal prior to connecting tractor 105 to a new trailer. For example, referring to FIG. 4, if no trailer sensors are physically associated with tractor 105, when the turn signal is activated, the ignore list register will be cleared in step 417. In a typical scenario, the tractor turn signal will be operated when its trailers are switched. Thus, this method is essentially "automatic" to the driver as it does not require the performance of a discrete operation to clear the ignore list register. However, in an alternate embodiment, the ignore list register may be cleared at the discretion of the driver by performing an operation such as turning off tractor display unit 100.

Figure 4A:
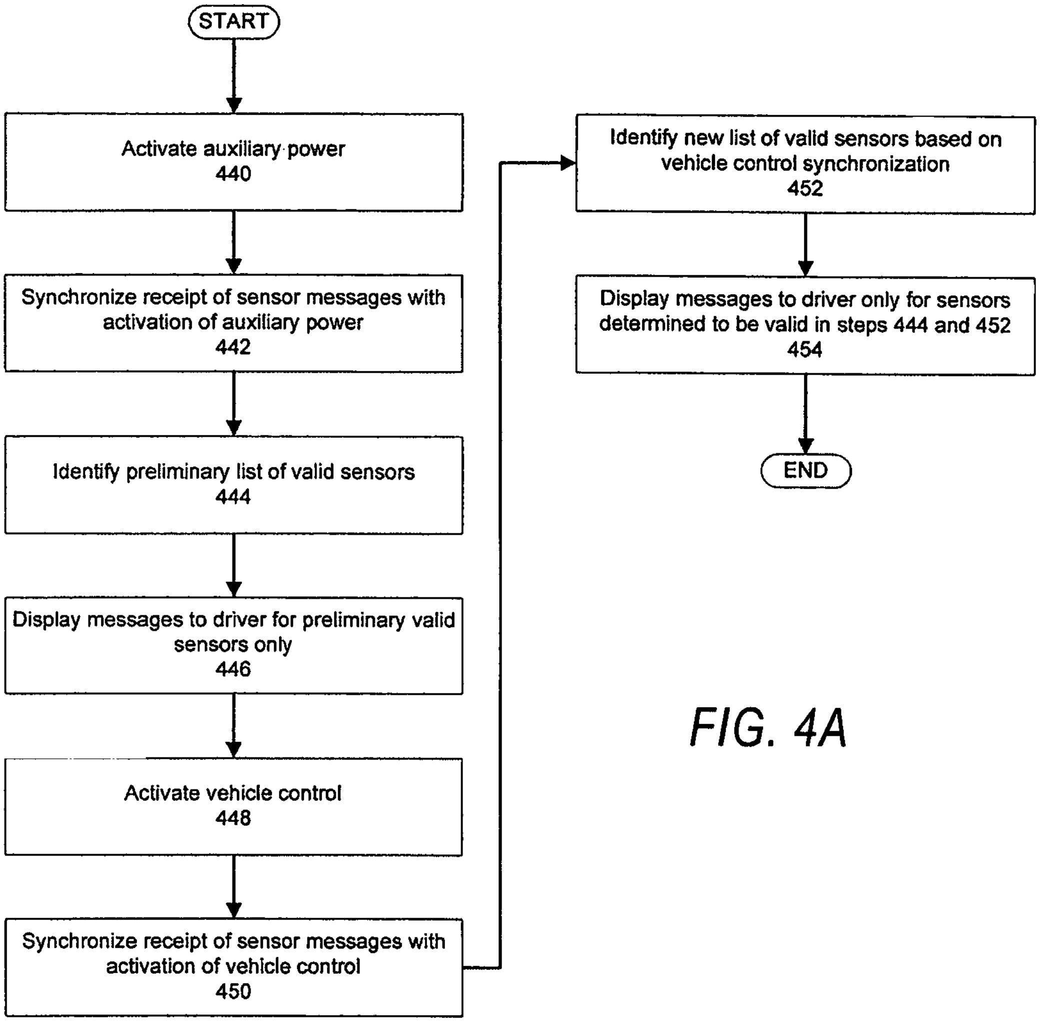
FIG. 4*a* describes a third embodiment of a method for associating a vehicle trailer and a vehicle; sand FIGS. 5, 5*a* and 5*b* describe a fourth embodiment of a method for associating a vehicle trailer and a vehicle.

In the embodiment of FIG. 4, the trailer sensors are powered up by the operation of the turn signal. As a result, side sensor information is only transmitted to the driver when the turn signal is activated. This has the benefit of not unnecessarily distracting the driver by transmitting sensor information only when a critical maneuver, such as a lane change, is being executed. However, it may be desirable to inform the driver of side obstacles even when the turn signals are not activated. FIG. 4*a* depicts a third embodiment of a method for associating a vehicle and vehicle trailer wherein sensor information can be displayed to the driver even if a vehicle control is not being operated, while still ensuring that the displayed information originates from sensors that are associated with the trailer that is attached to the vehicle.

In the embodiment of FIG. 4*a*, power is supplied to sensors 122 by the vehicle's auxiliary power system. In step 440, the auxiliary power is activated which initiates sensor initialization, configuration and transmission as described with respect to FIG. 2. In step 442, the activation of auxiliary power is synchronized with the reception of sensor messages. Based on this synchronization process, in step 444 a preliminary list of valid sensors is identified. In an especially preferred embodiment, the duration of steps 440, 442, and 444 is not more than about 200 milliseconds, as is the duration of steps 450, 452, and 454. While the embodiment of FIG. 4*a* uses auxiliary power synchronization to identify a preliminary list of valid sensors, other systems can be used. For example, synchronization with the activation of the trailer marker/running lights, tail lights, clearance or ID lamps, or license plate lamps can be used. However, in this embodiment the selected system preferably remains energized at all times (day and night) when the vehicle is being driven.

Because power is supplied by the auxiliary power circuit, sensors 122 and measurement devices 120 remain energized and continue transmitting messages to RF modem 106, regardless of whether a vehicle control is being operated. Until a vehicle control (e.g., turn signal or brake) is operated, the preliminary list is used to filter messages communicated to the driver. Thus, in step 446 only those messages originating from sensors in the preliminary list of valid sensors are displayed to the driver.

The preliminary list of valid sensors can be used to check the validity of sensors identified from a vehicle control synchronization process. Accordingly, in step 448 a synchronization event (e.g., the operation of a turn signal) occurs. Although sensors 122 and measurement devices 120 remain powered up when the auxiliary power is on, they are preferably configured to recognize the occurrence of the synchronization event. In one embodiment, a program resident in memory 127 is configured to cause measurement device 120 to transmit a unique message to RF Modem 106, which indicates the occurrence of a synchronization event. As mentioned previously, the TRAILER_MSG fields in FIG. 3 may be modified to provide this unique message.

Thus, in step 452 a second list of valid sensors is identified based on the synchronization of the turn signal operation and received sensor messages. In the case of a back up sensor, synchronization with the operation of the brakes is preferably used. The second list provides a means of confirming the accuracy of the sensors identified in the preliminary list (step 444). Preferably, once the turn signal has been activated, only those sensors determined to be valid based on both synchronization with the auxiliary power and synchronization with the turn signal will be displayed to the driver. Thus, in step 454 only messages originating from sensors identified as valid in steps 444 and 452 will be displayed to the driver. If the method of FIG. 4*a* is used, drivers will preferably activate the turn signal before departing on a trip to ensure that the list of associated sensors is as accurate as possible.

Figure 5:
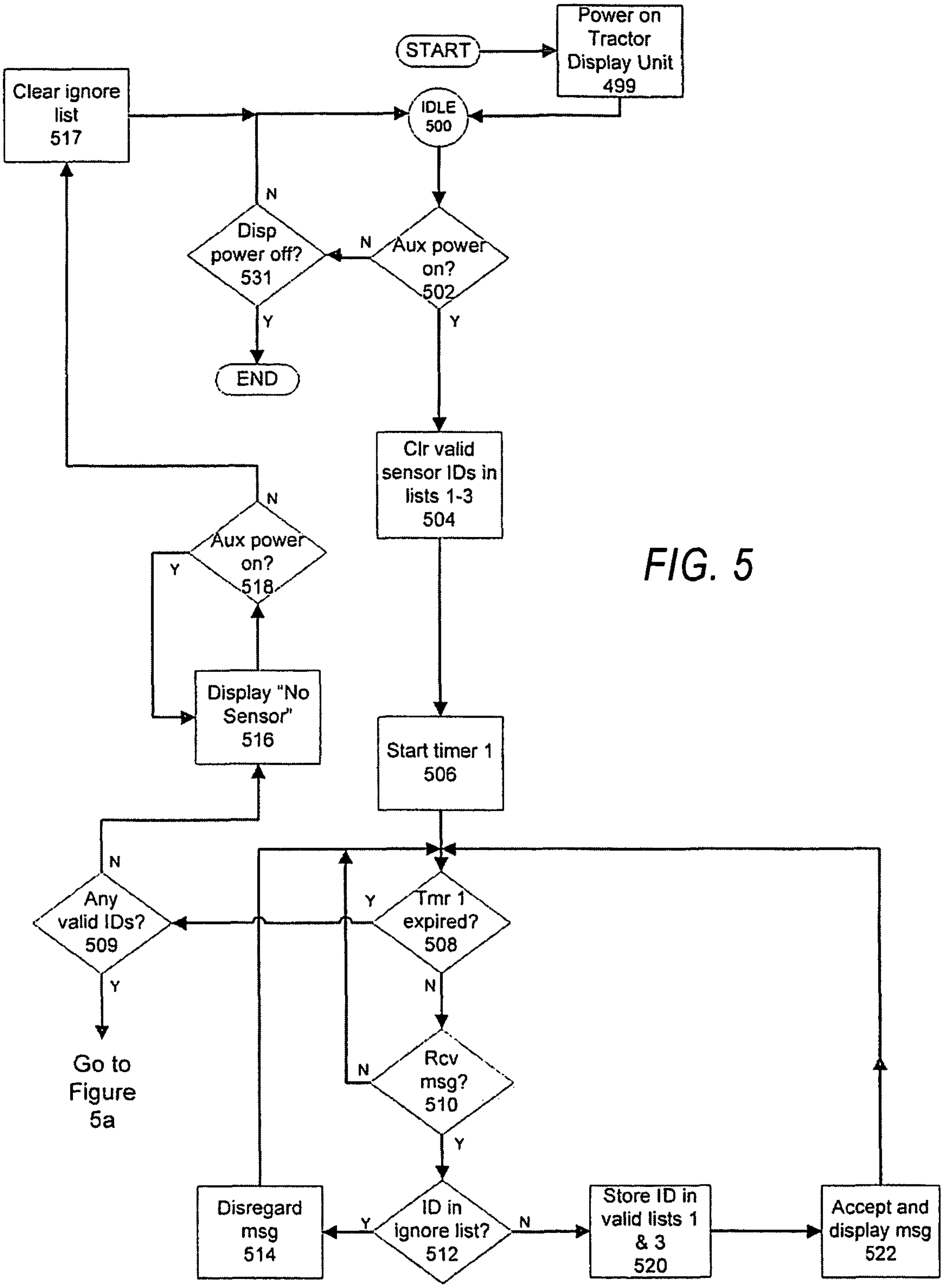
Figure 5A:
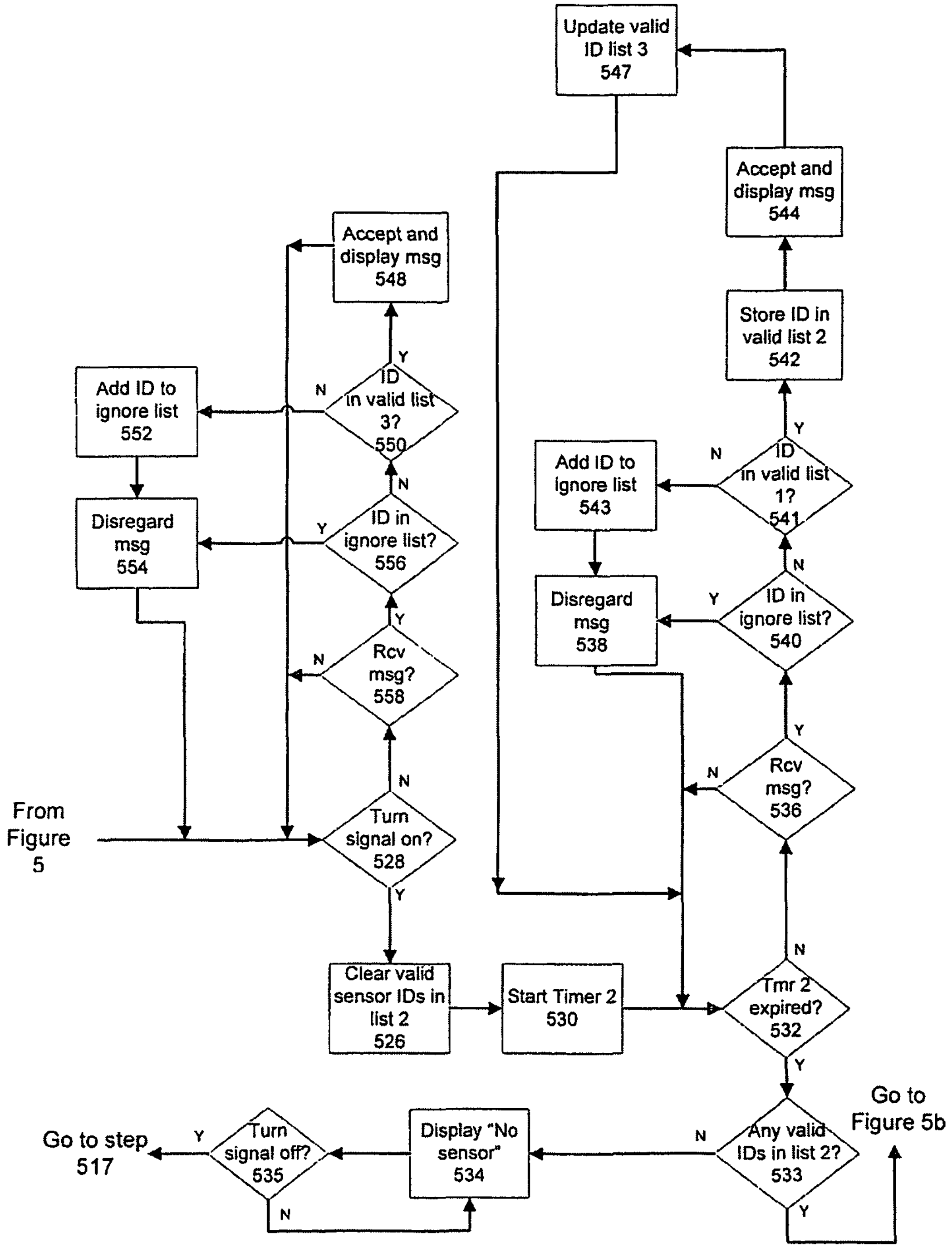
Figure 5B:
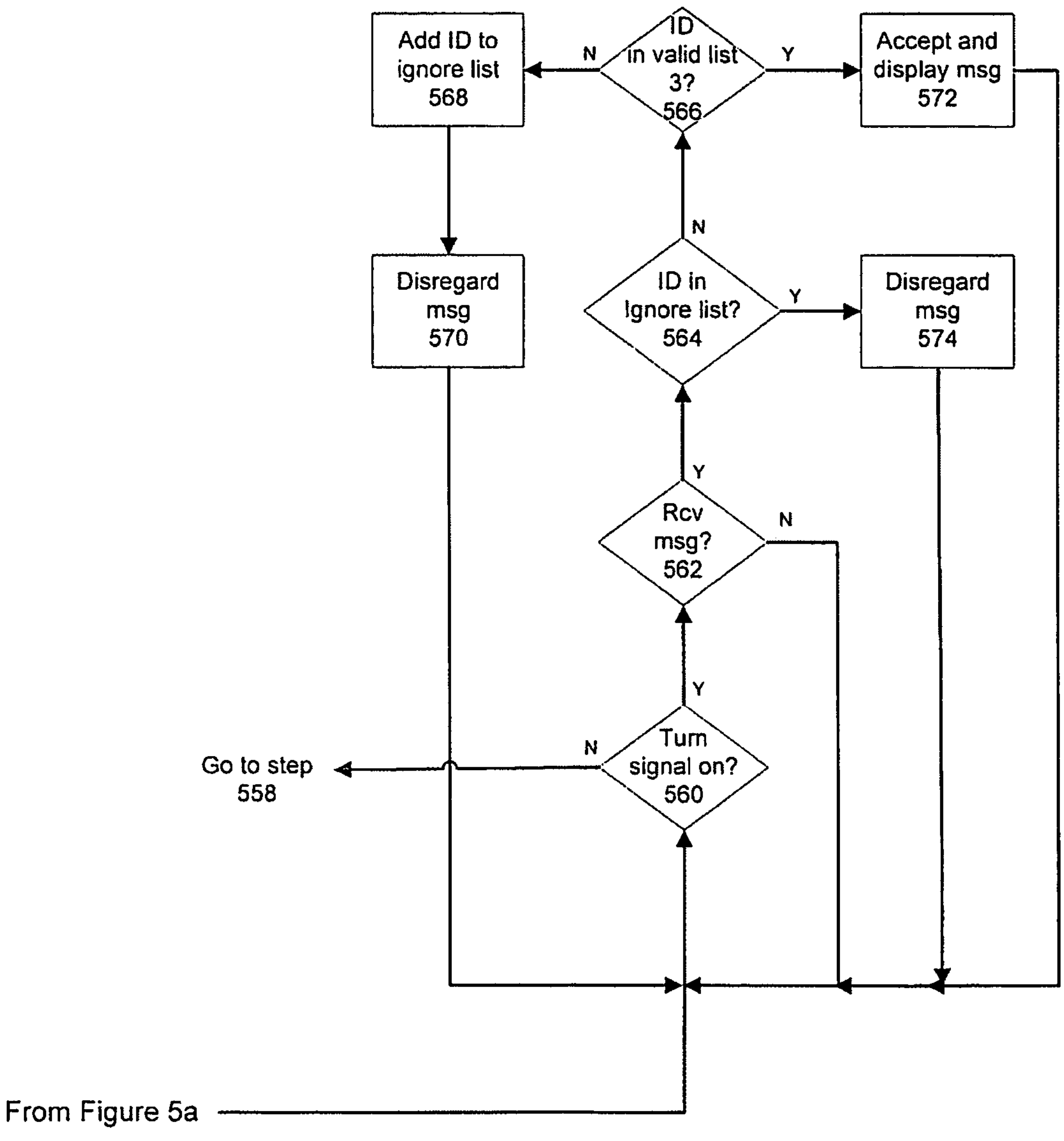

FIGS. 5, 5*a*, and 5*b* depict an alternate embodiment of a method of associating a vehicle and vehicle trailer wherein synchronization with the auxiliary power system and turn signal are both used to identify sensors associated with vehicle 105 and trailer 107. Again, the method is preferably implemented via a program stored in memory 103 of tractor display unit 100.

In the method depicted in FIG. 5, the side sensors are powered by the auxiliary power system. However, they are also configured to transmit a synchronization message to RF modem 106 when the turn signal is activated. Like the embodiment of FIG. 4*a*, this embodiment enables a group of potential sensors to be associated with tractor 105 even if the turn signal is not activated. Moreover, the driver can receive sensor messages regardless of whether the turn signal is activated. As indicated above, instead of powering the side sensors with auxiliary power, they can be powered by and synchronized with the activation of trailer marker/running lights, tail lights, clearance and ID lamps, or license plate lamps. Again, however, power is preferably supplied by a source that remains energized at all times (day and night) while the vehicle is being operated.

In step 499 power is supplied to tractor display unit 100. In step 500, tractor display unit 100 is in an idle state. In this state, no messages which are received are associated with valid sensors. Thus, in step 503 (not shown) any messages received prior to the activation of auxiliary power are added to an ignore list register, as described previously. Once display unit 100 is returned to the idle state, display 112 is preferably cleared within a predetermined time (step 501, not shown), such as 1 second.

The program then determines if the auxiliary power is on (step 502). In accordance with this embodiment, three lists of sensor identification numbers are used to identify valid sensors. Once auxiliary power is on, the program clears previously stored sensor identification numbers from all three lists (step 504). In step 506, a first timer sequence (timer 1) is started. This timer is used to begin the synchronization process and identify those sensors that transmit messages to RF modem 106 immediately or shortly after the auxiliary power is activated in order to identify those sensors that—at least preliminarily—appear to be associated with trailer 107. When the auxiliary power is activated, sensors 122 will initialize and transmit messages as depicted in FIG. 2. Thus, the program determines which sensors transmit messages within a brief interval, preferably about 100 milliseconds, following the activation of auxiliary power.

Steps 508, 510, 512, 520, and 522 comprise a method for synchronizing the activation of a vehicle's auxiliary power system with the reception of sensor messages. In step 508, the program determines if the timer interval has yet elapsed. If it has elapsed without any valid sensor messages having been received (step 509), the program proceeds to inform the driver that no sensor is present (step 516). In step 518, the program determines if the auxiliary power is on. If it is not, the program clears the ignore list register (step 517) and control is returned to idle state 500. If in step 518 the auxiliary power is on, control is returned to step 516.

If timer 1 has not expired in step 508, then in step 510 the program determines whether a sensor message has been received. If no messages have been received, control returns to step 508. If a message has been received, in step 512 the program determines if the sensor identification number for the message is stored in the ignore list register. If it is, the message is disregarded in step 514, and control is then returned to step 508. If the message is not in the ignore list, the program stores its sensor identification number in the valid sensor lists 1 and 3. For the time being, the "final" list of valid sensors (list 3) is the same as the preliminary list (list 1) identified following synchronization with the auxiliary power system. However, as discussed below, list 3 will subsequently be updated based on synchronization with the turn signal, once it is activated. Once the sensor is determined to be preliminarily valid in step 520, its message is then accepted and displayed in step 522.

Once a valid message is displayed (step 522), the program determines whether timer 1 has expired (step 508). If the timer has not yet expired, the program continues to identify valid sensors by returning control to step 510.

Once timer 1 expires (step 508), a preliminary list of sensors (list 1) belonging to trailer 107 is fixed. This list can be used to filter sensor messages received by RF modem 106, regardless of whether the turn signal is activated. However, it is preferred that once the turn signal is activated, the reception of sensor messages is synchronized with its activation as a check against the preliminary list. As indicated above, this resynchronization is accomplished by configuring measurement device 120 to transmit a synchronization message to RF modem 106 when the turn signal is activated.

Referring to step 509, if one or more valid sensor messages have been received, control proceeds to step 528 (FIG. 5*a*). In step 528 the program determines whether the turn signal has been activated. If it has not, the program filters any received messages based on the preliminary list of valid sensors previously generated (list 1). Thus, in step 558, the program determines if a message has been received. If one has been received, the program determines in step 556 whether the sensor associated with the message is in the ignore list register. If it is, the message is disregarded and control is returned to step 528.

If the received message did not originate from a sensor in the ignore list, in step 550 the program determines whether the sensor is included in the list of valid sensors (list 3). If the sensor is not in list 3, it is added to the ignore list register in step 552 and then disregarded in step 554. If the message is included in the list of valid sensors (list 3), it is accepted and displayed to the driver in step 548.

In step 528, if the program determines that the turn signal has been activated, turn signal synchronization is initiated by clearing the second list of valid sensor identification numbers (list 2) and starting a second timer (timer 2) (step 530). List 2 includes those sensors that sent messages to RF modem 106 during a predetermined interval following the operation of the turn signal. The predetermined interval is preferably about 200 milliseconds.

In step 532, the program determines if timer 2 has expired. In step 533 the program determines if any valid sensor messages (i.e., synchronization messages) have been received during turn signal synchronization by determining if any sensor identifiers are contained in valid list 2. If the timer has expired without a valid sensor message having been received by RF modem 106, a message is displayed in step 534 which indicates that no sensor is present. Control is then returned to step 517 (FIG. 5). If timer 2 has not expired, in step 536 the program determines if a sensor message has been received. If no message has been received, control returns to step 532. If a message has been received, in step 540 the program determines whether the sensor from which it originated is in the ignore list register. If the sensor is in the ignore list register, it is disregarded in step 538 and control is returned to step 532.

If the received sensor message did not originate from a sensor in the ignore list register, then in step 541 the program determines whether it is in the preliminary list of valid sensors (list 1). In this manner, the results of the auxiliary power synchronization are used as a check against the results of turn signal synchronization, which better ensures that the identified sensors are actually associated with trailer 107. Thus, if the sensor is not in the preliminary list, it is added to the ignore list in step 543, and its message is disregarded in step 538. If the sensor is included in the preliminary list, its sensor identification number is stored in valid sensor list 2 (step 542). The message is then accepted and displayed in step 544. Alternatively, turn signal synchronization could be used to override auxiliary power synchronization such that once the turn signal is activated, the preliminary list of valid sensors (list 1) is ignored. Preferably, however, both synchronization processes are used to better ensure an accurate association of sensors with vehicle 105.

In step 532, once timer 2 expires, the list of valid sensors obtained from auxiliary power synchronization and turn signal synchronization is fixed (until the turn signal is turned off and on again). However, at this point, there may be sensors in the preliminary list which did not synchronize with the turn signal operation (i.e., sensors which did not transmit synchronization messages during the timer 2 synchronization period), and therefore, which are not contained in list 2. Messages from these sensors are preferably filtered out and not displayed to the driver. Thus, in step 547, valid sensor list 3 is updated to included only those sensors appearing in both list 1 (the preliminary list) and list 2. For example, synchronization with the activation of the trailer marker/running lights can be used.

At this point, the current version of list 3 is preferably used to filter any messages received while the turn signal remains activated. However, once the turn signal is turned off, the current version of list 3 is used only until the turn signal is again activated. At that time, the turn signal synchronization process is preferably repeated, list 2 is reset in step 526, and list 3 is reset in step 547. Accordingly, if at least one valid sensor message has been received in step 533, control proceeds to step 560 (FIG. 5*b*). In step 560, the program determines if the turn signal has been turned off. If it has, control returns to step 558. If the turn signal has not been turned off, the program determines if a message has been received (step 562). If a message has been received, the program determines if the originating sensor is in the ignore register (step 564). If it is, the message is disregarded (step 574) and control is returned to step 560. If the message is not in the ignore list register, the program determines whether the originating sensor is in valid sensor list 3 (step 566). If it is, the message is accepted and displayed (step 572) and control is returned to step 560. If the message did not originate from a sensor in valid sensor list 3, the sensor is added to the ignore list register (step 568), disregarded (step 570), and control is returned to step 560.

Although the methods described above were illustrated using trailer side obstacle sensors, they can also be used with backup sensors. In addition, the methods may combine both back up sensors and side obstacle sensors. For example, the method illustrated in FIGS. 5, 5*a*, and 5*b* may be modified to include auxiliary power synchronization and separate synchronization processes for backup sensors and side obstacle sensors, wherein side obstacle synchronization is initiated by activating the turn signal and backup sensor synchronization is initiated by applying the brakes.

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. Accordingly, it will be understood that the invention is capable of modification and variation and is limited only by the following claims.

What is claimed is:

1. A method for associating a trailer sensor with a vehicle comprising:

transmitting a first synchronizing signal to a processor in response to a synchronization event;

transmitting a first trailer sensor message from a measurement device operably associated with the trailer sensor to the processor in response to the synchronization event;

establishing an association between the trailer sensor and the vehicle by determining whether the first trailer sensor message was received by the processor within a predetermined period of time after the synchronizing signal was received by the processor;

designating the trailer sensor as valid when the first trailer sensor message is received by the processor within the predetermined period of time, and invalid when the first trailer sensor message is received by the processor after the predetermined period of time has expired; and designating as valid a trailer sensor message transmitted from a measurement device operably associated with a valid trailer sensor and received by the processor after expiration of the predetermined period of time.

2. The method of claim 1, wherein the first synchronizing signal and the first trailer sensor message are generated by operating a vehicle control.

3. The method of claim 1, wherein the first synchronizing signal and the first trailer sensor message are generated by modulating power supplied to the measurement device operably associated with the trailer sensor.

4. The method of claim 1, wherein the predetermined period of time is not greater than about 200 milliseconds.

5. The method of claim 1, wherein the first synchronizing signal comprises at least one selected from a turn signal, a brake signal, an auxiliary power system signal, a trailer marker/running light signal, a stop lamp signal, a tail light signal, a license plate lamp signal, a hazard lamp signal, an antilock brake system signal, a clearance lamp signal, and an ID lamp signal.

6. The method of claim 1, wherein the measurement device comprises the vehicle trailer sensor, and the method further comprises supplying power to the measurement device when a vehicle control is operated.

7. The method of claim 1, wherein the first trailer sensor message is one selected from a side obstacle sensor message, a temperature sensor message, and a backup sensor message.

8. The method of claim 1 further comprising:

transmitting a second synchronizing signal to the processor in response to a second synchronization event; and transmitting a second trailer sensor message from the measurement device operably associated with the vehicle trailer sensor to the processor in response to the second synchronization event, wherein the second synchronizing signal comprises an auxiliary power signal, and the first synchronizing signal comprises one selected from a turn signal and a brake signal.

9. A method of claim 1 further comprising:

identifying valid trailer sensors based on the establishing of an association between a trailer sensor and the vehicle; and communicating sensor messages for valid trailer sensors to the vehicle operator.

10. The method of claim 9, wherein the first synchronizing signal is generated by operating a vehicle control.

11. The method of claim 9, wherein the first synchronizing signal is generated by modulating power supplied to the measurement device operably associated with the trailer sensor.

12. The method of claim 1, wherein the first trailer sensor message comprises trailer sensor identification information, the method further comprising:

receiving a second trailer sensor message after expiration of the predetermined time period, the second trailer sensor message comprising sensed information and trailer identification information; and communicating the sensed information to the vehicle operator if the trailer identification information in the second trailer sensor message corresponds to the trailer identification information in the first trailer sensor message.

13. The method of claim 12, wherein the first synchronizing signal is generated by operating a vehicle control.

14. The method of claim 12, wherein the sensed information is one selected from the group consisting of backup sensor data, temperature sensor data, and side obstacle sensor data.

15. The method of claim 12, wherein the first synchronizing signal is one selected from the group consisting of a turn signal, a brake signal, a trailer marker/running light signal, an auxiliary power signal, a stop lamp signal, a tail light signal, a license plate lamp signal, a hazard lamp signal, an antilock brake system signal, a clearance lamp signal, and an ID lamp signal.

16. The method of claim 12, wherein the first synchronizing signal is generated by modulating power supplied to the measurement device operably associated with the trailer sensor.

17. The method of claim 1 further comprising designating as invalid a trailer sensor message transmitted from a measurement device associated with an invalid vehicle trailer sensor and received by the processor after expiration of the predetermined time period.

18. The method of claim 1 further comprising displaying trailer sensor messages designated as valid to a vehicle operator.

19. The method of claim 1, wherein the first synchronizing signal is transmitted from a vehicle control.

20. The method of claim 1 further comprising supplying power to the measurement device substantially concurrently with transmission of the first synchronizing signal.

21. A method for establishing an association between a trailer measurement device attached to a trailer and a vehicle used to transport the trailer, the method comprising:

operating a vehicle control to generate a control signal and a synchronizing signal;

transmitting the control signal from the vehicle to the trailer, the control signal configured to cause a trailer measurement device located on the trailer to transmit a synchronizing message to a processor;

transmitting the synchronizing signal to the processor;

transmitting the synchronizing message from the trailer measurement device to the processor in response to the control signal transmitted from the vehicle control to the trailer;

establishing an association between the vehicle and the trailer measurement device by determining whether the trailer synchronizing message was received by the processor within a predetermined period of time after the synchronizing signal was received by the processor; and designating the trailer measurement device as valid when the trailer synchronizing message is received by the processor within the predetermined period of time, and invalid when the trailer synchronizing message is received by the processor after the predetermined period of time has expired.

22. The method of claim 21, wherein transmission of the synchronizing signal occurs substantially concurrent with the transmission of the control signal.

23. The method of claim 21 further comprising designating as valid a trailer message transmitted from the valid trailer measurement device and received by the processor after expiration of the predetermined period of time.

24. The method of claim 21, wherein the control signal comprises at least one selected from a turn signal, a brake signal, an auxiliary power system signal, a trailer marker/running light signal, a stop lamp signal, a tail light signal, a license plate lamp signal, a hazard lamp signal, an antilock brake system signal, a clearance lamp signal, and an ID lamp signal.

25. The method of claim 21, wherein the processor is located on the vehicle.

* * * * *